US008626358B2

(12) United States Patent
McGuffin et al.

(10) Patent No.: US 8,626,358 B2
(45) Date of Patent: Jan. 7, 2014

(54) AUTOMATIC PRESENTATION OF A SHORTCUT PROMPT TO VIEW A DOWNLINK REQUEST MESSAGE RESPONSIVE TO A CONFIRM-RESPONSE MESSAGE

(75) Inventors: Thomas F. McGuffin, Bellevue, WA (US); Reetu Gupta, Redmond, WA (US); Divya Swarup Giriyappa Srinivasan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 477 days.

(21) Appl. No.: 12/893,293

(22) Filed: Sep. 29, 2010

(65) Prior Publication Data

US 2012/0078447 A1 Mar. 29, 2012

(51) Int. Cl.

| | |
|---|---|
| ***G01C 23/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |

(52) U.S. Cl.
USPC .......... 701/3

(58) Field of Classification Search
USPC .......... 701/3
See application file for complete search history.

(56) References Cited

U.S. PATENT DOCUMENTS

| | | | | |
|---|---|---|---|---|
| 6,175,314 | B1 * | 1/2001 | Cobley | 340/945 |
| 7,979,199 | B2 * | 7/2011 | Judd et al. | 701/120 |
| 8,280,741 | B2 * | 10/2012 | Colin et al. | 704/275 |
| 2001/0042098 | A1 * | 11/2001 | Gupta et al. | 709/206 |
| 2004/0124998 | A1 * | 7/2004 | Dame | 340/945 |
| 2007/0215745 | A1 * | 9/2007 | Fleury et al. | 244/2 |
| 2008/0154486 | A1 * | 6/2008 | Coulmeau | 701/120 |
| 2008/0163093 | A1 * | 7/2008 | Lorido | 715/771 |
| 2010/0027768 | A1 * | 2/2010 | Foskett | 379/88.14 |

FOREIGN PATENT DOCUMENTS

| | | |
|---|---|---|
| JP | 2001266298 | 9/2001 |
| JP | 2001283397 | 10/2001 |

* cited by examiner

*Primary Examiner* — Khoi Tran
*Assistant Examiner* — Harry Oh
(74) *Attorney, Agent, or Firm* — Fogg & Powers LLC

(57) ABSTRACT

A system to reduce head-down time for a flight crew is provided. The system includes a functional module including a set of screens used to receive and send controller pilot data link communications (CPDLC) messages between an aircraft and a ground system; a message composition screen communicatively coupled to the functional module; and a shortcut interface communicatively coupled to the functional module, wherein a shortcut prompt is automatically displayed when a confirm-response message received responsive to a previously-sent downlink request message is viewed, and wherein the previously-sent downlink request message is displayed when the shortcut interface is implemented.

19 Claims, 4 Drawing Sheets

AUTOMATIC PRESENTATION OF A SHORTCUT PROMPT TO VIEW A DOWNLINK REQUEST MESSAGE RESPONSIVE TO A CONFIRM-RESPONSE MESSAGE

GOVERNMENT LICENSE RIGHTS

The U.S. Government may have certain rights in the present invention as provided for by the terms of Government Contract No. DTFAWA-10-A-80003 awarded by the Federal Aviation Agency (FAA).

BACKGROUND

A controller pilot data link communications (CPDLC) human machine interface (HMI) is a set of screens used by members of an aircraft flight crew to receive uplink messages from the air traffic controller and to send downlink messages to the air traffic controller. Today when a pilot of an aircraft wants to change altitude or speed, the pilot talks to the air traffic controller (ATC), typically, via a very high frequency (VHF) radio and asks for the desired altitude or speed. The ATC datalink system (also referred to herein as a CPDLC system) permits the pilot make the request for the desired altitude or speed via a datalink.

One type of CPDLC message that the pilot creates, requests changes to the flight such as a different altitude or a different speed. The air traffic controller, upon receiving the downlink request message, reads it and sends a response. Usually the response grants the request or denies the request. In some cases, the controller may be puzzled by the request and question whether the pilot really meant to send that specific request. In this case the controller has a third response, which is to respond with the "confirm request" uplink. The CPDLC uplink message "confirm request" is alpha-numerically indicated as "UM143" and is sometimes sent responsive to a downlink request message. The air traffic controller sends a confirm request message when there is concern that the wrong value may have been sent in the original message.

The intent of the confirm request message is to trigger a resending of the last downlink request message sent by the pilot. Currently, when the confirm request message is received, the pilot searches for the last downlink request message sent. When the last downlink request message sent is found, the pilot then navigates through air traffic control menu screens, selects the same downlink request message screen, composes the message by filling in the data to match the original downlink request message or revised data, and sends the downlink request message again. This process requires considerable "head-down time" during which the pilot is looking down at the display showing the HMI screens instead of flying the aircraft.

If there is operational urgency in the message being sent, the head-down time adds time to the processing of the message and delays an urgently required action.

SUMMARY

The present application relates to a system to reduce head-down time for a flight crew. The system includes a functional module including a set of screens used to receive and send controller pilot data link communications (CPDLC) messages between an aircraft and a ground system; a message composition screen communicatively coupled to the functional module; and a shortcut interface communicatively coupled to the functional module, wherein a shortcut prompt is automatically displayed when a confirm-response message received responsive to a previously-sent downlink request message is viewed, and wherein the previously-sent downlink request message is displayed when the shortcut interface is implemented.

DRAWINGS

In accordance with common practice, the various described features are not drawn to scale but are drawn to emphasize features relevant to the present invention. Like reference characters denote like elements throughout figures and text.

DETAILED DESCRIPTION

Figure 1:
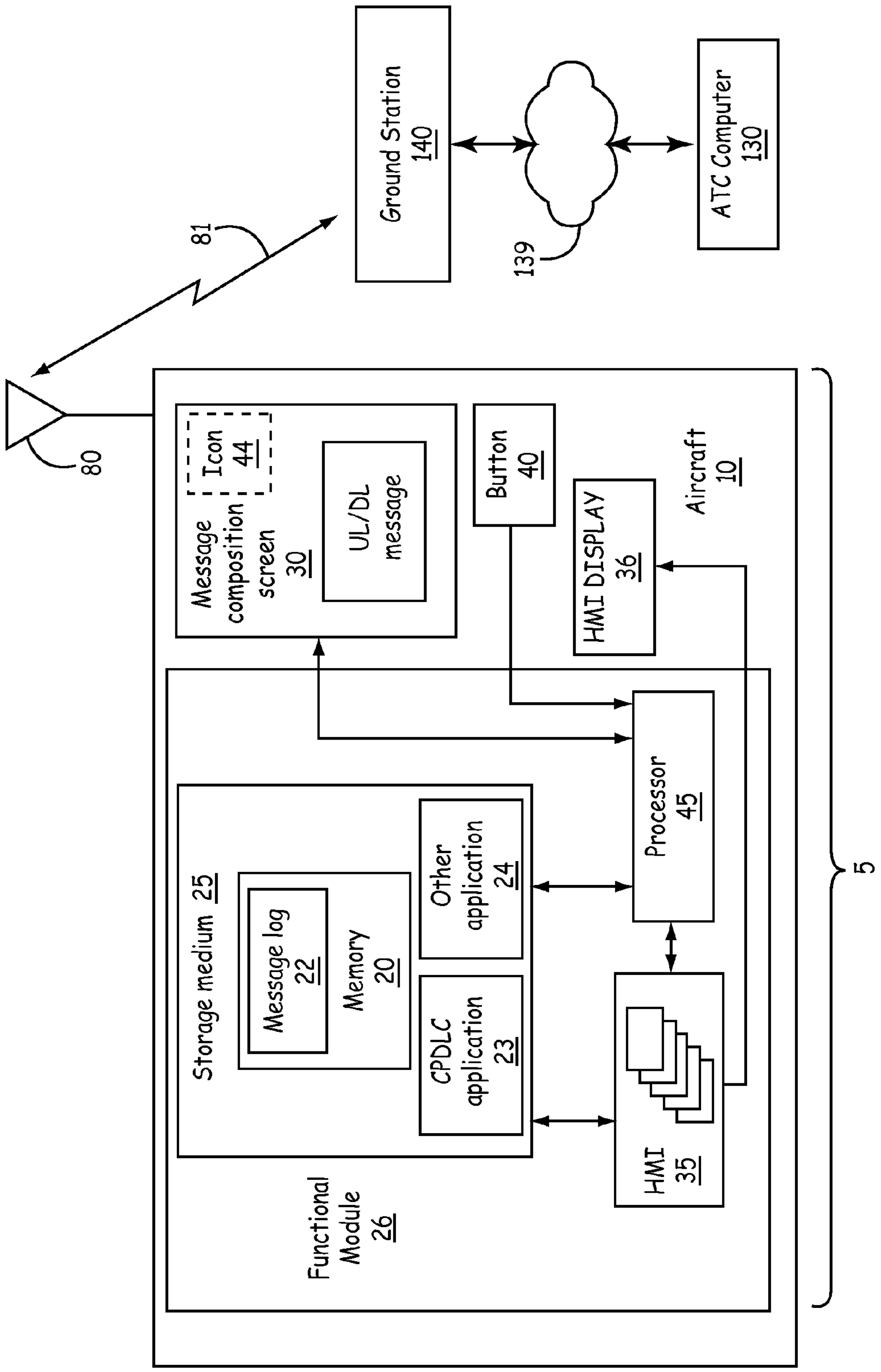
FIG. 1 shows an embodiment of a system to reduce head-down time for a flight crew in accordance with the present invention.

The process described herein provides a system and method to reduce the head-down time for responding to a confirm-response message to a downlink request message previously sent from an aircraft. With reduced head-down time, the downlink request message is resent to the ground control more quickly after receipt of a confirm-response message. The process described herein also improves accuracy of the resent downlink request messages since the pilot is not required to type duplicate data into the resent downlink request message. Upon receipt of a confirm-response message, the system and method described herein allow the flight crew member to review the originally sent message and either resend a message with the same data as the originally sent message or modify the data in the originally sent message and send the modified message.

Downlink messages are sent from the aircraft to an air traffic controller on the ground. Uplink messages are sent from the air traffic controller on the ground to the aircraft. The controller pilot data link communications (CPDLC) includes a data dictionary of predefined message elements that the pilot and controller can use to compose messages to send. There are several categories of message elements: requests (e.g., request speed 240 kts, request attitude 25,000 feet); reports (e.g., maintaining speed 230 kts); and responses (e.g., WILCO, UNABLE, AFFIRM, NEGATIVE, CONFIRM REQUEST).

The systems described herein monitor received confirm-response messages. As defined herein the confirm-response messages include, but are not limited to, a CPDLC CONFIRM REQUEST message; a CPDLC CONFIRM ASSIGNED LEVEL message; a CPDLC CONFIRM ASSIGNED SPEED message; a CPDLC CONFIRM ASSIGNED ROUTE message; CPDLC CONFIRM TIME OVER REPORTED WAYPOINT message; a CPDLC CONFIRM NEXT WAYPOINT ETA message; a CPDLC CONFIRM ENSUING WAYPOINT message; and a CPDLC CONFIRM SQUAWK message. These messages are CPDLC messages UM135-UM144, respectively.

When the avionics receives a confirm-response message in response to a downlink request message, the received confirm-response message is displayed for viewing by the pilot or other crew member. The pilot goes to a message log to view the confirm-response message. Exemplary downlink request messages include "request altitude MMM" or "request speed LLL", where MMM and LLL are numerical values.

If the air traffic controller feels the data in the downlink request message is incorrect (e.g., a typographical error by the pilot) the air traffic controller sends a confirm-response message so the pilot can review the request and be sure that data is correct. When a confirm-response message is received and viewed by the pilot, a shortcut prompt is displayed (or otherwise provided) for the pilot. A touch of a button (or a touch of an icon on a display) triggers a processor to retrieve the down link message (including the data in the downlink request message) that prompted the confirm-response message from the air traffic controller. The pilot then looks at the displayed downlink request message to determine if the data in the originally sent downlink request message was correct. In accordance with the present application, the pilot is not required to navigate through the display menu in the HMI to a screen for recomposing the downlink request message for resending responsive to the confirm-response message. Thus, the pilot requires less head-down time to downlink the downlink request message. The terms "pilot" and "flight crew" are used interchangeably herein. The flight crew can also include a co-pilot of the aircraft.

FIG. 1 shows an embodiment of a system 5 used to reduce head-down time for a flight crew in accordance with the present invention. System 5 includes a functional module 26, a CPDLC HMI display 36, a message composition screen 30, and a shortcut interface 40 and/or 44. The functional module 26 includes a human machine interface (HMI) 35, a processor 45, and storage medium 25.

The CPDLC human machine interface (HMI) 35 includes a set of screens used by members of an aircraft flight crew to receive and send CPDLC messages for viewing on the CPDLC HMI display 36. Exemplary CPDLC HMI includes an air traffic controller (ATC) HMI. In one implementation of this embodiment, CPDLC messages are exchanged over the aeronautical telecommunications network (ATN) and displayed on the HMI display 36. In another implementation of this embodiment, future air navigation system (FANS) CPDLC messages are exchanged over an ACARS network and displayed on the HMI display 36.

In one implementation of this embodiment, the CPDLC HMI display 36 is a multifunction control display unit (MCDU). In another implementation of this embodiment, the CPDLC HMI display 36 is a multi-function display (MFD).

The storage medium 25 includes the memory 20 and software executable by the processor 45 to implement the process described herein. The software includes at least one controller pilot data link communications (CPDLC) application 23 as well as other applications 24. The message log 22 is stored in a memory 20. The message log 22 shows a pilot the received uplink (UL) messages and the downlink (DL) messages sent.

The shortcut interface 40 and/or 44 is implemented (pushed, touched, or used) to retrieve the downlink request message associated with the received confirm-response message. The shortcut interface 40 and/or 44 is communicatively coupled to the functional module 26. When a confirm-response message responsive to a previously-sent downlink request message is received and viewed by the pilot, a shortcut prompt is automatically displayed on the message composition screen 30. In one implementation of this embodiment, the shortcut prompt is an icon 44 that blinks on and off to indicate the receipt of a confirm-response message. In another implementation of this embodiment, the shortcut prompt is a message that appears on the display 30 reading "shortcut available" or "push shortcut button for shortcut" or some other message to indicate to the pilot that the shortcut is available to respond to the confirm-response message 141. If the pilot uses the shortcut interface 40 or 44 responsive to the display of the shortcut prompt, the previously-sent downlink request message is displayed.

In another implementation of this embodiment, the shortcut prompt is a side-link type message displayed to the flight crew member. In an exemplary case, the side-link type message is a COMM alert message. As defined herein, a sidelink or COMM alert message is a message in the message log that looks like an uplink message but is generated by the system.

In one implementation of this embodiment, the shortcut interface is button 40. In another implementation of this embodiment, the shortcut interface is an icon 44 displayed on the message composition screen 30. In yet another implementation of this embodiment, both the button 40 and the icon 44 are available to the pilot. In one implementation of this embodiment, an implementation of the shortcut interface 40 is a push of the button when a shortcut prompt is viewed by the pilot on the display. In another implementation of this embodiment, an implementation of the shortcut interface 40 is a touch of a blinking icon 44.

The functional module 26 can be one of a communication management unit (CMU), a communication management function (CMF), a flight management computer (FMC), a flight management function (FMF), an electronic flight bag (EFB), other avionics modules (i.e., another type of avionics module), or a future developed functional module 26 for use with avionics.

An antenna 80 external to the aircraft 10 is used to communicatively couple the aircraft 10 to a ground station 140 via the wireless communication link 81. The ground station 140 is communicatively coupled via a ground network 139 to an air traffic controller (ATC) computer 130 referred to herein as air traffic controller (ATC) computer 130. The ground station 140, the ground network 139 and the air traffic controller (ATC) computer 130 together form a ground system.

The processor 45 executes software (CPDLC application 23 and other applications 24) and/or firmware that causes the processor 45 to perform at least some of the processing described here as being performed by the system to reduce head-down time. At least a portion of such software 23 and 24 and/or firmware executed by the processor 45 and any related data structures are stored in storage medium 25 during execution of the software. Memory 20 includes any suitable memory now known or later developed such as, for example, random access memory (RAM), read only memory (ROM), and/or registers within the processor 45. In one implementation, the processor 45 includes a microprocessor or microcontroller. Moreover, although the processor 45 and memory 20 are shown as separate elements in FIG. 1, in one implementation, the processor 45 and memory 20 are implemented in a single device (for example, a single integrated-circuit device). The software 23 and 24 and/or firmware executed by the processor 45 includes a plurality of program instructions that are stored or otherwise embodied on a storage medium 12 from which at least a portion of such program instructions are read for execution by the processor 45. In one implementation, the processor 45 includes processor support chips and/or system support chips such as application-specific integrated circuits (ASICs).

Figure 2:
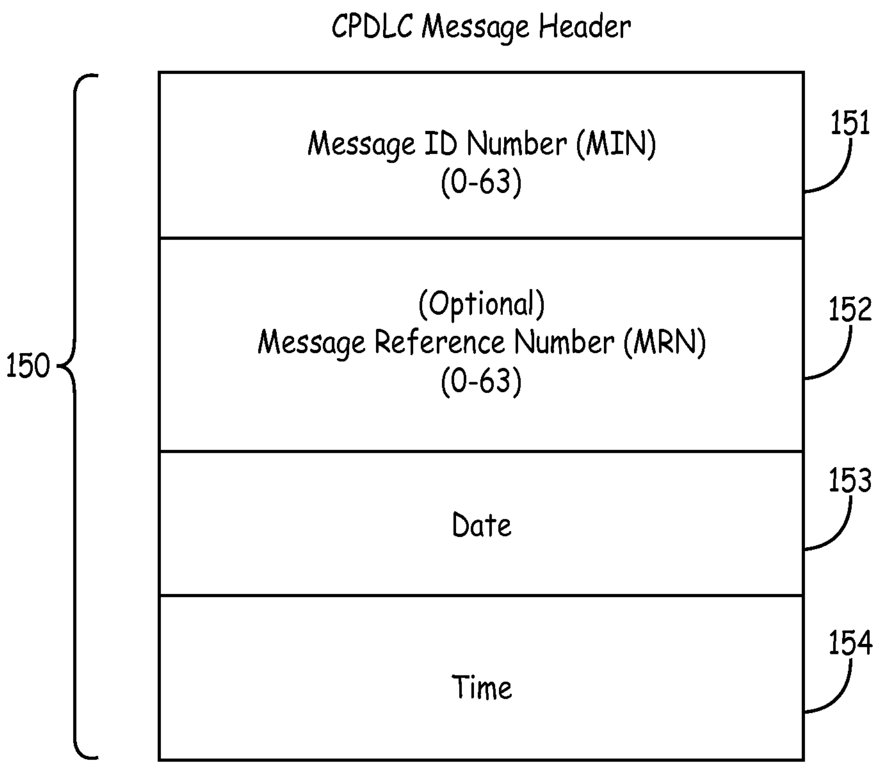
FIG. 2 shows an embodiment of a CPDLC message header.

FIG. 2 shows an embodiment of a CPDLC message header 150. In this exemplary header, the first field 151 of the CPDLC message header 150 includes information indicative of the message identification number (MIN), which includes numbers 0-63 and information indicative of the message reference number (MRN), which also includes numbers 0-63.

Every CPDLC message 160 includes a MIN in the header 150. If a CPDLC message is generated responsive to a previously received CPDLC message, then that newly generated CPDLC message includes a MRN that has the same value as the MIN of the associated received CPDLC message. In embodiments, the message is formatted in other ways that are able to provide information indicative of a MIN and that are also able to provide information indicative of the MRN. In order to facilitate description of the use of the MIN and MRN, the following discussion references the exemplary CPDLC message header 150 of FIG. 2.

Figure 3:
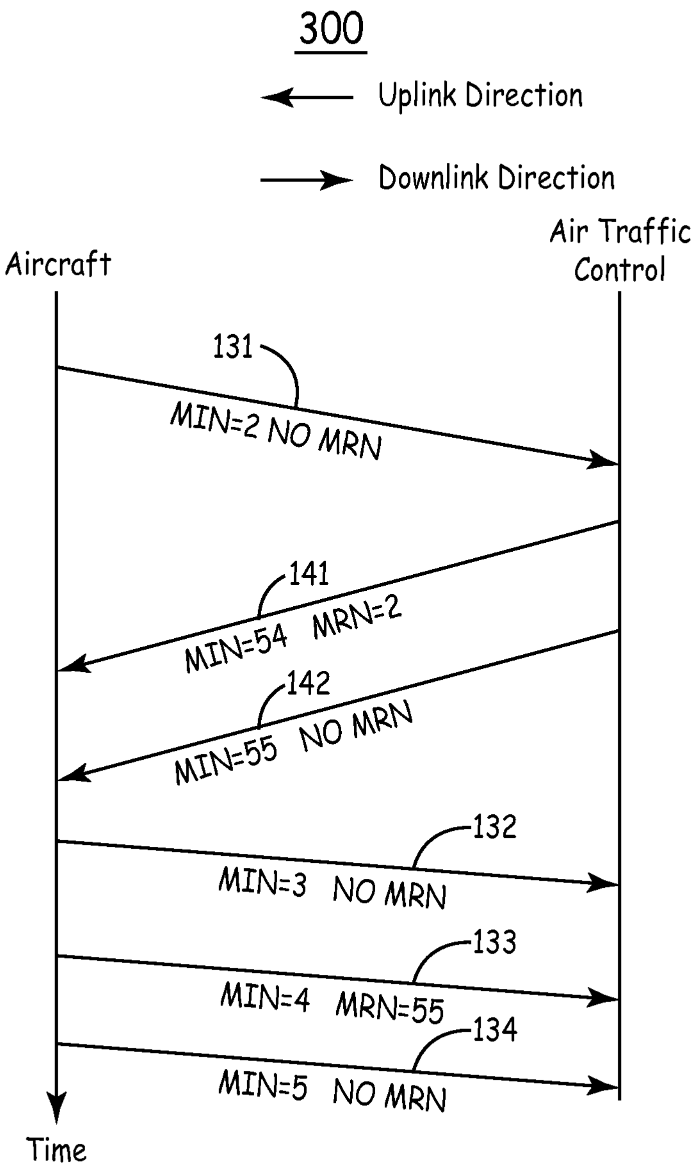
FIG. 3 shows an exemplary flow diagram of downlink and uplink messages.
Figure 4:
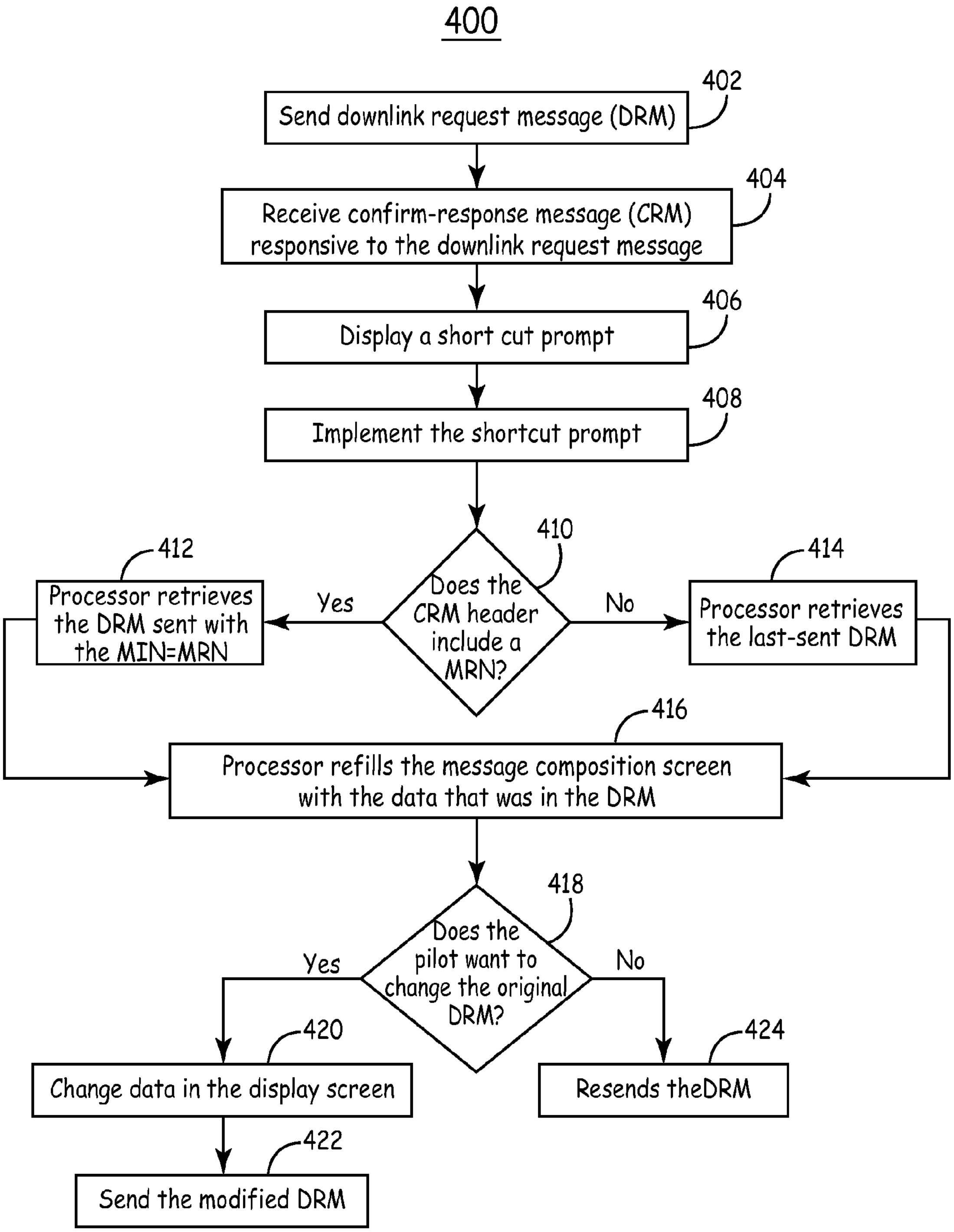
FIG. 4 is a flow diagram of an embodiment of a method to reduce head-down time for a flight crew in accordance with the present invention.

FIG. 3 shows an exemplary flow diagram 300 of downlink and uplink messages. The downlink messages and the uplink messages referred to herein are CPDLC messages 160 formatted as shown in FIG. 4. The first downlink request message 131 has a MIN of 2 and no MRN. The first uplink message 141 is responsive to the first downlink request message 131 and has a MIN of 54 and a MRN of 2. The MRN of 2 in the first uplink message 141 (also referred to herein as "confirm-response message 141") indicates that this message is responsive to the first downlink request message 131. A second uplink message 142 has a MIN of 55 and no MRN. Thus, the second uplink message 142 is not related to any other message. A second downlink message 132 has a MIN of 3 and no MRN. Thus, the second downlink message 132 is not related to any other message. A third downlink message 133 has a MIN of 4 and a MRN of 55, which indicates that the third downlink message 133 is responsive the second uplink message 142. A fourth downlink message 134 has a MIN of 5 and no MRN. The fourth downlink message 134 is the downlink request message sent responsive to the confirm-response message 141. In one implementation of this embodiment, the fourth downlink message 134 includes a MRN that is the MIN (54) of the confirm-response message 141.

FIG. 4 is a flow diagram of an embodiment of a method 400 to reduce head-down time for a flight crew in accordance with the present invention. The method 400 is described with reference to the system 5 shown in FIG. 1 and flow diagram 300 of FIG. 3. It is to be understood that method 400 can be implemented using other embodiments of system 5 as is understandable by one skilled in the art who reads this document.

At block 402, the pilot of aircraft 10 sends a downlink request message (DRM), such as downlink request message 131, to the ATC 130. Responsive to receiving the downlink request message 131, an uplink message 141 is sent from the ATC 130 to the aircraft 10 via communication link 81. The MIN in the first field 151 of the downlink request message 131 (e.g., 2) is the MRN in the second field 152 of the uplink message 141. In one implementation of this embodiment, the uplink message 141 is a CONFIRM REQUEST message (e.g., CPDLC message UM143). In another implementation of this embodiment, the uplink message 141 is one of the CPDLC messages UM135-UM144.

At block 404, the functional module 26 receives confirm-response message 141 and the confirm-response message 141 is stored in the message log 22. An alert is used to notify the pilot that a message has been received. The alert can be visual (e.g., a light) or aural (e.g., a chime).

At block 406, the pilot or other crew member goes to the message log 22 to view the uplink message 141. Since the uplink message is a confirm-response message, the processor 45 automatically displays a shortcut prompt for viewing by the pilot as the pilot views the confirm-response message 141. The shortcut prompt can be an icon 44 or a message on the message composition screen 30 that reads "shortcut available" or "push shortcut button for shortcut" or some other message to indicate to the pilot that the shortcut is available to respond to the confirm-response message 141. At block 408, the pilot uses (implements) a shortcut prompt. In one implementation of this embodiment, the shortcut prompt is implemented by the push of the shortcut interface 40. Other methods of prompting an implementation of the shortcut prompt are possible. For example, the system 5 can include a microphone and pilot can say "SHORTCUT" to initiate the shortcut.

At block 410, the processor 45 determines if the uplink message 141 included a MRN in the second field 152 of the CPDLC message header 150 of the confirm-response message 141. If there is a MRN in the second field 152 of the CPDLC message header 150 of the confirm-response message 141, the flow proceeds to block 412. At block 412, the processor 45 retrieves the downlink request message 131 stored in the message log 22 that has a MIN value in the first field 151 that matches the MRN value in the second field 152 in the CPDLC message header 150 and the flow proceeds to block 416.

If, at block 410, the processor 45 determines the uplink message 141 does not include a MRN in the second field 152 of the CPDLC message header 150 of the confirm-response message, the flow proceeds to block 414. At block 414, the processor 45 retrieves the last-sent downlink request message 131 and the flow proceeds to block 416.

At block 416, the processor 45 refills the message composition screen 30 with data in the downlink request message 131 retrieved at block 412 or 614. This provision of the downlink request message 131 for viewing on the message composition screen 30 is the result of a user (e.g., the pilot or other flight crew member) implementing the displayed shortcut prompt at block 408. At this point, the pilot is able to see the data from the downlink request message 131 to determine if a change is required. The pilot does not need to navigate through air traffic control menu screens to select the same downlink request message screen.

In one implementation of this embodiment, the blocks 406-414 of method 400 are not implemented and method 400 flows from block 404 to block 416.

At block 418, it is determined if the pilot wants to change the data that was sent in the original downlink request message 131 before resending the downlink request message 134. If the pilot wants to change the data that was sent in the original downlink request message 131 before resending the downlink request message 134, the flow proceeds to block 420.

At block 420, the pilot or other crew member changes the data in the display 30. This is done by typing the correct data in the appropriate data field of the refilled message composition screen 30. In this manner, updated data is received from the user (e.g., pilot) and the data in the downlink request message shown in the message composition screen is changed to form a modified downlink request message. In an exemplary case, the downlink request message 131 received at the ATC 130 was a request to move to an altitude of 300 feet. The ATC 130 on the ground recognizes that the aircraft 10 is currently at 2,500 feet and is taking off The ATC 130 wants to make sure that the pilot actually wants to reduce altitude during takeoff. In this scenario, the ATC 130 sends a CONFIRM REQUEST message (um143) to the pilot. When the pilot sees the data from the downlink request message 131 that has refilled the message composition screen 30 at block 416 indicates a request to move to 300 feet altitude, the pilot recognizes the error and replaces the number 300 with the number 30,000 since the pilot had originally intended to request to move to an altitude of 30,000 feet in the downlink request message 131.

At block 422, the pilot sends the modified downlink request message 134 shown on the message composition screen 30 by implementing a send-prompt. Upon receiving the send-prompt at the processor 45, the modified downlink request message is sent from the aircraft 10 to the ATC 130 via the wireless communication link 81. Upon receiving the send-prompt, the modified downlink request message is sent from the aircraft 10 to the ATC 130 via the wireless communication link 81.

If it is determined at block 418 that the pilot does not want to change the data that was sent in the downlink request message 131 before sending the downlink request message 134, the flow proceeds to block 420. At block 424, the pilot sends the message shown on the display 30 as downlink request message 134, without modification, by implementing a send-prompt. Thus, in this manner, the pilot did not need to search for the last-sent downlink request message and then navigate through air traffic control (ATC) menu screens to select the same downlink request message screen, and recompose the message by filling in the data to correct the data in the original downlink request message 131. Upon receiving the send-prompt at the processor 45, the downlink request message is resent from the aircraft 10 to the ATC 130 via the wireless communication link 81.

Thus, by an implementation of the shortcut interface, which is automatically displayed when a confirm-response message is received and viewed, the previously-sent downlink request message or the associated downlink request message is displayed (with data filled in the appropriate field of the message) for viewing by the pilot. The pilot does not need to search for the last downlink request message sent and then navigate through air traffic control (ATC) menu screens to select the same downlink request message screen, and recompose the message by filling in the data to match the data in the downlink request message 131. If the pilot decides to change the data before resending the downlink request message, the pilot enters the new data on the display screen in place of the original data, and then provides the send-prompt to send the modified downlink request message.

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to reduce head-down time for a flight crew, the system comprising:

a functional module including a set of screens used to receive and send controller pilot data link communications (CPDLC) messages between an aircraft and a ground system;

a message composition screen communicatively coupled to the functional module; and a shortcut interface communicatively coupled to the functional module, wherein a shortcut prompt is automatically displayed by a processor in the functional module responsive to a CPDLC confirm-response message being received responsive to a previously-sent downlink request message, and wherein the previously-sent downlink request message is displayed on the message composition screen responsive to the shortcut interface being implemented responsive to the shortcut prompt.

2. The system of claim 1, wherein the CPDLC confirm-response message responsive to the previously-sent downlink request message includes:

a message header including information indicative of a message identification number and information indicative of a message reference number, and wherein a message identification number of the downlink request message is the message reference number of the confirm-response message.

3. The system of claim 1, wherein the functional module further includes a processor; and a storage medium including a controller pilot data link communications (CPDLC) application executable by the processor.

4. The system of claim 1, wherein the functional module is one of a communication management unit, a communication management function, a flight management computer, a flight management function, an electronic flight bag, and an avionics module.

5. The system of claim 1, wherein the CPDLC confirm-response message is one of: a controller pilot data link communications CONFIRM REQUEST message; a controller pilot data link communications CONFIRM ASSIGNED LEVEL message; a controller pilot data link communications CONFIRM ASSIGNED SPEED message; a controller pilot data link communications CONFIRM ASSIGNED ROUTE message; a controller pilot data link communications CONFIRM TIME OVER REPORTED WAYPOINT message; a controller pilot data link communications CONFIRM NEXT WAYPOINT ETA message; a controller pilot data link communications CONFIRM ENSUING WAYPOINT message; and a controller pilot data link communications CONFIRM SQUAWK message.

6. The system of claim 1, wherein the functional module further includes:

a processor; and a message log in a memory, wherein, responsive to:

receiving the confirm-response message, and receiving a shortcut prompt at the shortcut interface, the processor retrieves the previously-sent downlink request message from the message log and displays the previously-sent downlink request message on the message composition screen.

7. The system of claim 1, wherein the system is an air traffic control datalink system.

8. A method to reduce head-down time for a flight crew, the method comprising:

receiving a CPDLC confirm-response message responsive to a previously-sent downlink request message at a functional module;

displaying a shortcut prompt on a message composition screen responsive to receiving the confirm-response message; and refilling the message composition screen with data in the downlink request message responsive to a user implementing a shortcut interface responsive to the displayed shortcut prompt.

9. The method of claim 8, further comprising:

determining if a message header of the CPDLC confirm-response message includes a message reference number.

10. The method of claim 9, if the message header of the CPDLC confirm-response message includes the message reference number, the method further comprises:

matching the message reference number in the message header of the CPDLC confirm-response message with a message identification number of the downlink request message, responsive to the user implementing the shortcut interface.

11. The method of claim 10, wherein refilling the message composition screen with data in the downlink request message comprises:

refilling the message composition screen with the downlink request message having the matching message identification number.

12. The method of claim 11, further comprising:

receiving updated data from the user, wherein the data in the downlink request message shown in the refilled message composition screen is modified; and upon receiving a send-prompt, sending the modified downlink request message, the modified downlink request message having a message reference number that matches a message identification number in the message header of the confirm-response message.

13. The method of claim 11, further comprising:

upon receiving a send-prompt, resending the downlink request message that is refilling the message composition screen.

14. The method of claim 9, if the message header does not include the message reference number, the method further comprises:

retrieving a last-sent downlink request message; and refilling the message composition screen with the last-sent downlink request message.

15. The method of claim 14, further comprising:

receiving updated data from the user, wherein the data in the last-sent downlink request message shown in the refilled message composition screen is modified; and upon receiving a send-prompt, sending the modified downlink request message, the modified downlink request message having a message reference number that matches a message identification number in the message header of the confirm-response message.

16. The method of claim 14, further comprising:

upon receiving a send-prompt, sending the last-sent downlink request message that is refilling the message composition screen.

17. The method of claim 8, wherein refilling the message composition screen with data in the downlink request message comprises one of:

refilling the message composition screen with data in a previously-sent downlink request message having a message identification number that matches a message reference number of the confirm-response message; and refilling the message composition screen with data in a last-sent downlink request message, the method further comprising:

modifying data in the downlink request message displayed on the message composition screen; and upon receiving a send-prompt, sending the modified downlink request message related.

18. The method of claim 8, wherein receiving the CPDLC confirm-response message comprises receiving one of one of: a controller pilot data link communications CONFIRM REQUEST message; a controller pilot data link communications CONFIRM ASSIGNED LEVEL message; a controller pilot data link communications CONFIRM ASSIGNED SPEED message; a controller pilot data link communications CONFIRM ASSIGNED ROUTE message; a controller pilot data link communications CONFIRM TIME OVER REPORTED WAYPOINT message; a controller pilot data link communications CONFIRM NEXT WAYPOINT ETA message; a controller pilot data link communications CONFIRM ENSUING WAYPOINT message; and a controller pilot data link communications CONFIRM SQUAWK message.

19. A system to reduce head-down time for a flight crew, the system comprising:

a functional module including:

a set of screens used to receive and send controller pilot data link communications (CPDLC) messages between an aircraft and a ground system, at least one CPDLC application;

a processor to execute the at least one CPDLC application;

a message composition screen communicatively coupled to the functional module; and wherein a shortcut prompt is automatically displayed by a processor in the functional module responsive to a CPDLC confirm-response message being received responsive to a previously-sent downlink request message, and wherein the previously-sent downlink request message is displayed on the message composition screen responsive to the shortcut interface being implemented responsive to the shortcut prompt, wherein the message header of the CPDLC confirm-response message includes a message identification number of the previously-sent downlink request message, and wherein a message header of a downlink request message sent responsive to the CPDLC confirm-response message includes the message identification number of the CPDLC confirm-response message.

* * * * *